(12) United States Patent
Erickson et al.

(10) Patent No.: US 7,690,874 B2
(45) Date of Patent: Apr. 6, 2010

(54) ROTARY TAPERED TOOL HOLDER WITH ADAPTER SLEEVE

(75) Inventors: Robert Alfred Erickson, Raleigh, NC (US); William Michael Long, Blairsville, PA (US); Ted R. Massa, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 190 days.

(21) Appl. No.: 11/955,012

(22) Filed: Dec. 12, 2007

(65) Prior Publication Data

US 2009/0155011 A1 Jun. 18, 2009

(51) Int. Cl.
*B23Q 3/12* (2006.01)
(52) U.S. Cl. ...................................... 409/234
(58) Field of Classification Search ......... 409/231–234; 408/238–240
See application file for complete search history.

(56) References Cited

U.S. PATENT DOCUMENTS

| | | | |
|---|---|---|---|
| 2,084,801 A | 6/1937 | Hall | |
| 4,621,960 A | 11/1986 | Tollner | |
| 4,840,520 A * | 6/1989 | Pfalzgraf | 409/232 |
| 5,964,556 A * | 10/1999 | Toyomoto | 409/234 |
| 6,224,306 B1 * | 5/2001 | Hiroumi et al. | 409/234 |
| 6,352,395 B1 * | 3/2002 | Matsumoto et al. | 409/234 |
| 6,691,799 B2 | 2/2004 | Kuhnle et al. | |
| 6,923,451 B2 | 8/2005 | Taguchi et al. | |
| 7,115,082 B2 | 10/2006 | Prust et al. | |
| 7,144,210 B2 | 12/2006 | Massa et al. | |
| 7,186,064 B1 | 3/2007 | Erickson et al. | |
| 2005/0175425 A1 | 8/2005 | Watanabe et al. | |
| 2007/0110534 A1 | 5/2007 | Erickson et al. | |

FOREIGN PATENT DOCUMENTS

| | | | |
|---|---|---|---|
| DE | 03912503 A1 | | 3/1990 |
| JP | 09038837 A | * | 2/1997 |
| JP | 10058260 A | * | 3/1998 |
| JP | 2000042857 A | * | 2/2000 |

* cited by examiner

*Primary Examiner*—Daniel W Howell
(74) *Attorney, Agent, or Firm*—Larry R. Meenan

(57) ABSTRACT

A rotary tapered tool holder includes a body and an adapter sleeve disposed about a portion of the body. The body and the adapter sleeve have front and rear contact surfaces with different taper angles. The front contact surfaces are optimized for an interference fit and the rear contact surfaces provide an axial stop and support band when the tool holder is assembled into a clamping receptacle. Face contact is achieved between a flange contact surface of the body and a face contact surface of the clamping receptacle.

17 Claims, 5 Drawing Sheets

ROTARY TAPERED TOOL HOLDER WITH ADAPTER SLEEVE

BACKGROUND OF THE INVENTION

Rotary tapered tool holders, one type of which is commonly referred to as "steep taper" tool holders, are well known in the art. Steep taper tool holders have a male tapered portion extending from a V-flange portion. The V-flange portion has a V-shaped groove to assist the machine tool changer mechanism in gripping the tool. One of the most common steep taper tool holder designs is the Caterpillar V-flange tool holder, generally referred to as a "CV" tool holder. CV tool holders are one of several standards for very similar tool holder designs, all of which have 7/24 tapers (7 inches of diameter change per 24 inches of length). Another common 7/24 tapered tool holder standard is the "BT" tool holder.

The tapered shank portion of the steep taper tool holder is held in a corresponding female tapered portion of a clamping receptacle. The tool holder is held in and rotated at high speeds by the clamping receptacle. There are generally two types of steep taper tool holders: (1) taper-only contact tool holders, in which only the tapered surface of the tool holder contacts the tapered inner surface of the clamping receptacle; and (2) face-taper contact tool holders, wherein the face of the tool holder flange is in contact with the face of the clamping receptacle in addition to surface contact between the tapered portion of the tool holder and the clamping receptacle. The face-taper contact type tool holder can require a specially designed clamping receptacle, wherein the mating face of the clamping receptacle is machined more precisely to facilitate operating in contact with the face of the tool holder V-flange portion.

Conventional steep taper tool holders of both types can suffer from certain problems. For example, in a standard steep taper tool holder the taper tolerances for tool holder taper and clamping receptacle taper produce a situation wherein the adjacent tapers are in hard contact at the front, but may be out of contact at the rear. When the tool holder is rotated, this divergence of taper angles can produce 'rocking' of the tool holder with resulting loss of accuracy and balance. As the clamping receptacle is rotated at high speeds, both the clamping receptacle taper diameter and the tool holder taper diameter increase under the influence of centrifugal force. However, the clamping receptacle taper diameter increases faster than the tool holder taper diameter. Moreover, the diametrical increase is typically not uniform along the length of the clamping receptacle taper, but is greatest at the front of the taper. As a result, the clamping receptacle taper angle changes, and the tapered surface can even become convex. If the clamping receptacle taper were to expand uniformly (maintain the same taper angle), then good fit between clamping receptacle and tool holder could be maintained at high speeds via the tool moving axially into the clamping receptacle. Unfortunately, because the clamping receptacle taper angle changes, the fit between tool holder and clamping receptacle degrades at high speeds. The result is two-fold for the standard tool holder. First, since the overall clamping receptacle taper diameter increases faster than the tool holder taper diameter, and there is no face contact, the tool holder is drawn into to the clamping receptacle (moves axially). Second, because of the taper angle change, the primary contact, which is initially at the front of the taper, moves to the middle or rear of the taper, which results in increased 'rocking' of the tool holder in the clamping receptacle. The tool holder taper also increases in diameter and changes angle at high speeds, but the amount of change is very small compared to the clamping receptacle because the mean diameters of the tool holder are much smaller.

There are also disadvantages encountered with prior art face-taper contact steep taper tool holders. For example, "rocking" can be greatly reduced. However, as the tool holder is rotated at high speeds, the clamping receptacle taper diameter still increases faster than the tool holder taper diameter, although axial positioning is maintained due to the face contact. But, since the tool holder cannot be drawn into the clamping receptacle, a radial gap is produced between the tapers, which allows radial motion of the tool holder and results in loss of accuracy and balance.

Another prior art type face-taper contact tool holder uses a tapered sleeve on a shank which moves axially as the rotational speed increases so that the tool holder stays in contact with the clamping receptacle. The moveable sleeve can ease tolerancing requirements, but as the tool holder is rotated at high speeds the sleeve moves axially to stay in contact with the clamping receptacle. However, the sleeve also increases in diameter due to the centrifugal forces. Therefore, even though the sleeve maintains contact with the clamping receptacle, the sleeve can lose contact with the tool holder shank, resulting in a radial gap, thus resulting in unbalance and loss of accuracy.

Another prior art type face-taper contact tool holder uses a sleeve which is split such that it can flex circumferentially and therefore change diameter. The sleeve can thus stay in simultaneous contact with the tool holder shank and the clamping receptacle taper as the clamping receptacle taper diameter in changing. However, the sleeve still cannot adapt to the changing taper angle, such that contact is still localized at either the front or rear of the taper. Also, friction limits the ability of the sleeve to always maintain solid contact between tool holder and taper, and some 'slop' is bound to exist, reducing tool holder stiffness. The split sleeve can also be prone to contamination problems since any material that is present between the sleeve and the tool holder shank will reduce the design's effectiveness, and sealing can be impractical.

Each of the prior art tool holder designs described above, generally in the order listed, can provide an incremental improvement over the previous designs. However, each can also have corresponding increases in mechanical complexity, and all require a face contact to operate. Moreover, although each appears to be effective when at rest, they each have varying limitations at high speeds. In addition, the tight tolerance on the gage diameter is difficult to manufacture and the steep taper angle is not suited for face-taper contact. The spring loaded sleeves do not provide proper interface forces in the tool holder, thereby limiting rigidity.

Therefore, the prior art face-taper contact tool holders can provide an improvement over the standard tool holder, but they can also have varying limitations at high speeds, increased in mechanical complexity, and all require face contact.

Accordingly, there is a need for an improved steep taper tool holder which can overcome the limitations of the known steep taper tool holders, and reduce or eliminate taper related accuracy and balance problems.

BRIEF SUMMARY OF THE INVENTION

To solve these and other problems associated with conventional steep taper tool holders, the inventors of the present invention have developed a rotary tapered tool holder, comprising a body including a first contact outer surface formed at a first taper angle with respect to a central, longitudinal axis of the body, a second contact outer surface formed at a second taper angle with respect to the central, longitudinal axis of the body, and a flange contact surface substantially perpendicular to the central, longitudinal axis of the body. The tool holder further includes an adapter sleeve disposed about a portion of the body, the adapter sleeve including an inner surface and an outer surface, the inner surface including a first contact inner surface formed at approximately the first taper angle, a second contact inner surface formed at approximately the second taper angle, the outer surface formed at a third taper angle. The first, second and third taper angles are different from each other to cause an interference fit between the adapter sleeve and a tapered bore of a clamping receptacle when the rotary tapered tool holder is assembled into a clamping receptacle. The flange contact surface of the body engages a face contact surface of the clamping receptacle when the rotary tapered tool holder is assembled into the clamping receptacle.

In another aspect of the invention, a rotary tapered tool holder comprises a body including a first contact outer surface formed at a first, non-zero taper angle with respect to a central, longitudinal axis of the body, a second contact outer surface formed at a zero taper angle with respect to the central, longitudinal axis of the body, and a flange contact surface substantially perpendicular to the central, longitudinal axis of the body. The tool holder also includes an adapter sleeve disposed about a portion of the body, the adapter sleeve including an inner surface and an outer surface, the inner surface including a first contact inner surface formed at the first, non-zero taper angle, a second contact inner surface formed at the zero taper angle, and an outer surface formed at a second, non-zero taper angle. The second, contact outer surface of the body and the second contact inner surface of the adapter sleeve provide an axial stop and support band for the adapter sleeve when the rotary tapered tool holder is assembled into a clamping receptacle. The flange contact surface of the body engages a face contact surface of the clamping receptacle when the rotary tapered tool holder is assembled into the clamping receptacle.

In yet another aspect of the invention, a method of assembling a rotary tapered tool holder, the tool holder comprising a body including a first contact outer surface, a second contact outer surface, and a flange contact surface; and an adapter sleeve disposed about a portion of the body, the adapter sleeve including an inner surface and an outer surface, the inner surface including a first contact inner surface, a second contact inner surface, the method comprising the steps in the following order:
 (a) moving the tool holder body and the adapter sleeve in an axial direction in a clamping receptacle until the second contact outer surface of the body contacts the second contact inner surface of the adapter sleeve;
 (b) moving the tool holder body relative to the adapter sleeve in the axial direction in the clamping receptacle until the first contact outer surface of the body contacts the first contact inner surface of the adapter sleeve; and
 (c) moving the tool holder body relative to the adapter sleeve in the axial direction in the clamping receptacle producing elastic deformation of the adapter sleeve until the flange contact surface of the body engages a face contact surface of the clamping receptacle of the rotary tapered tool holder.

BRIEF DESCRIPTION OF THE DRAWINGS

Further features of the present invention, as well as the advantages derived therefrom, will become clear from the following detailed description made with reference to the drawings in which.

DETAILED DESCRIPTION OF THE INVENTION

Figure 1:
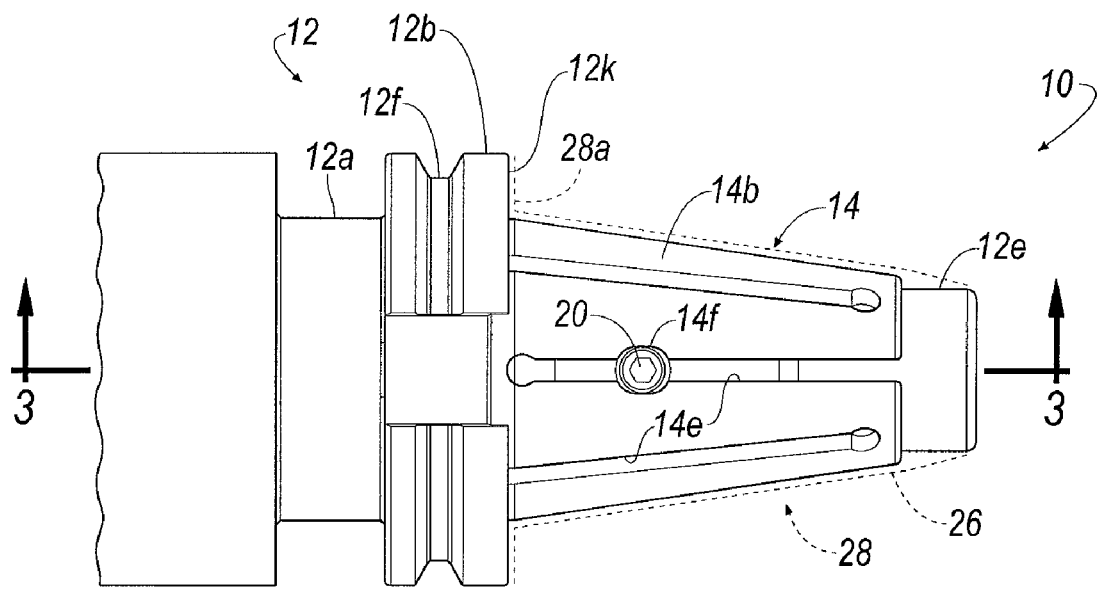
FIG. 1 is a side view of a rotary tapered tool holder with an adapter sleeve according to an embodiment of the invention.
Figure 2:
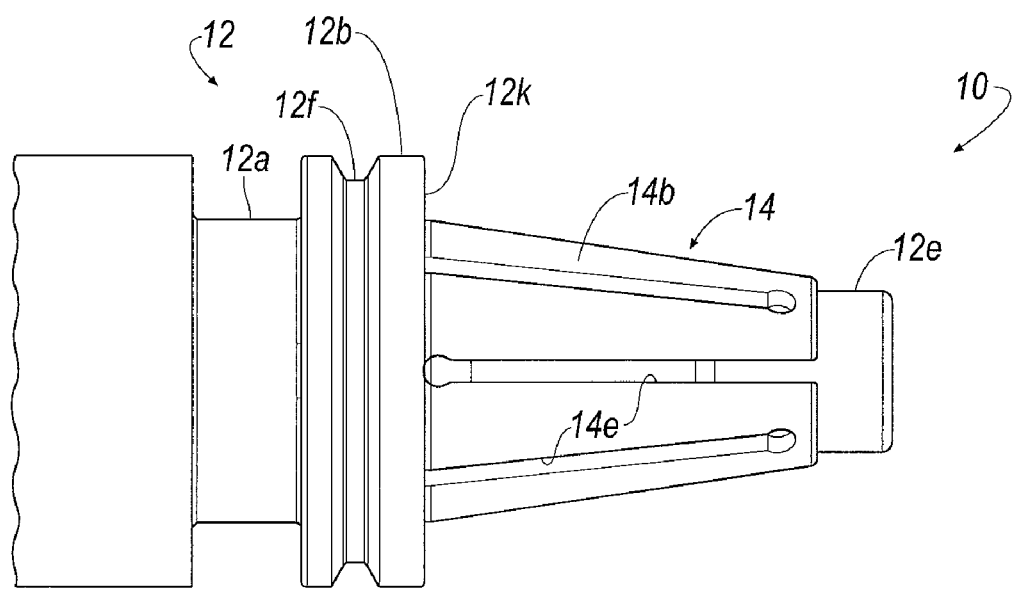
FIG. 2 is another side view of the rotary tapered tool holder with an adapter sleeve according to an embodiment of the invention.
Figure 3:
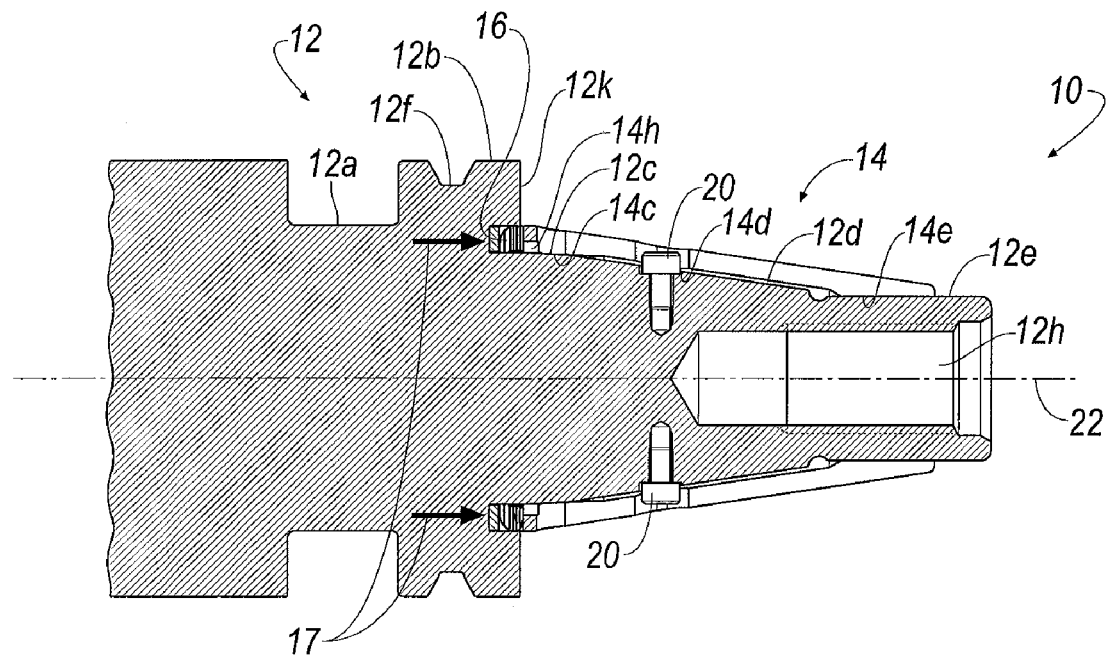
FIG. 3 is a cross-sectional view of the rotary tapered tool holder taken along line 3-3 of FIG. 1.

Referring now to FIGS. 1-3, there is shown an embodiment of a rotary, steep taper tool holder, shown generally at 10, for detachably retaining a rotary tool in a tapered bore 26 of a clamping receptacle 28 having a face contact surface 28a (shown in phantom in FIG. 1). In general, the rotary tapered tool holder 10 comprises a body 12 and an adapter sleeve 14 that may be in the form of a collet that is disposed about a portion of the body 12.

Figure 4:
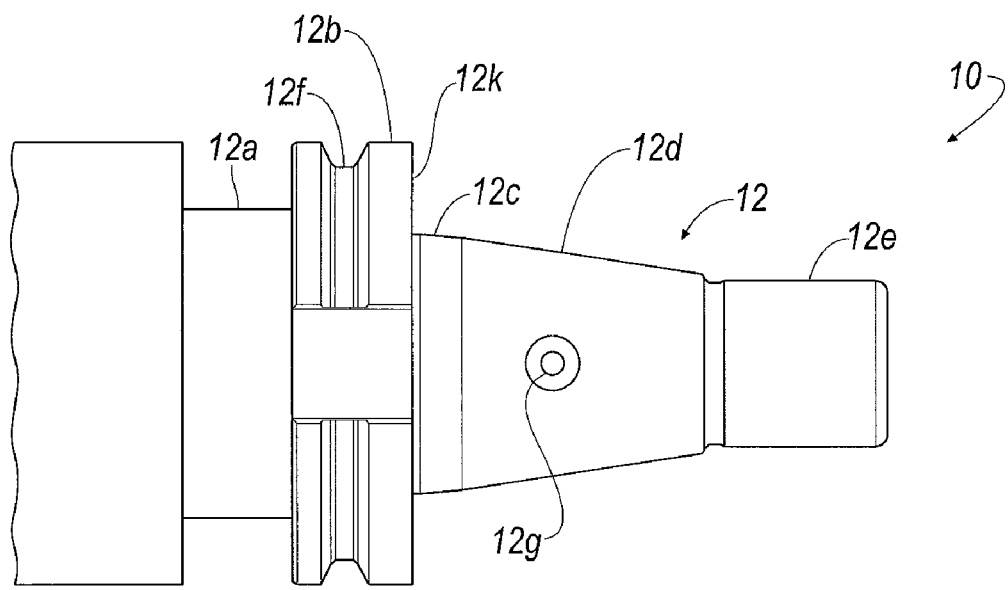
FIG. 4 is a side view of the body of the rotary tapered tool holder according to an embodiment of the invention.
Figure 5:
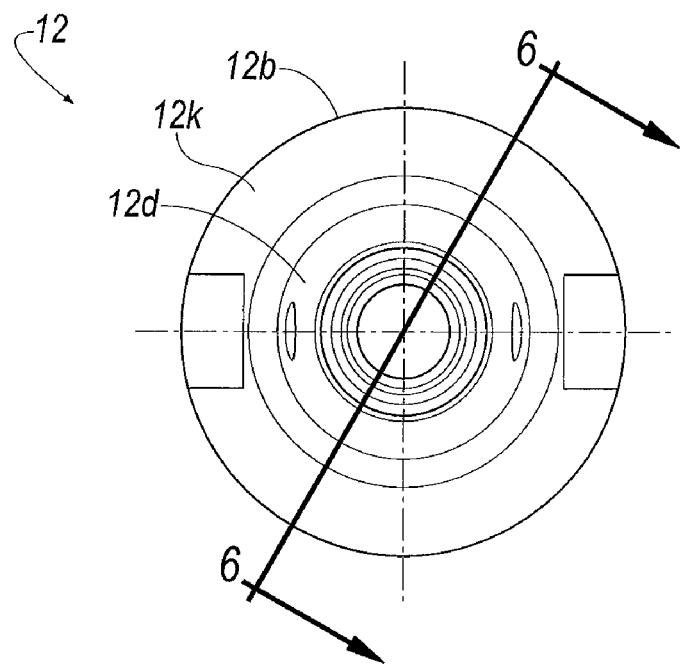
FIG. 5 is an end view of the body of the rotary tapered tool holder according to an embodiment of the invention.
Figure 6:
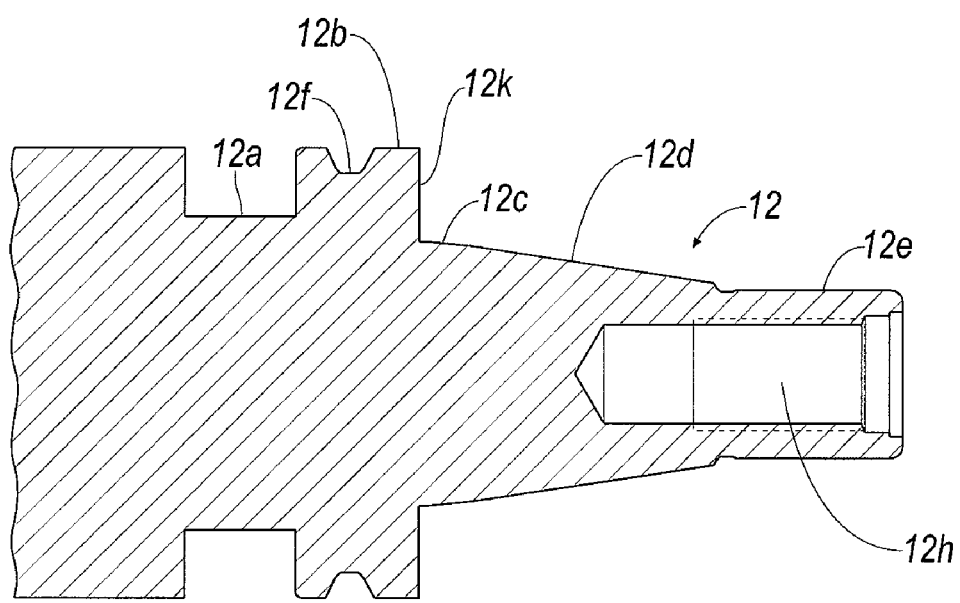
FIG. 6 is a cross-sectional view of the body of the rotary tapered tool holder according to an embodiment of the invention taken along line 6-6 of FIG. 5.

Referring now to FIGS. 4-6, the body 12 includes a tool holder portion 12a, a flange member 12b, and an outer surface comprising a front contact outer surface 12c, an intermediate outer surface 12d and a rear contact outer surface 12e. In the illustrated embodiment, the front contact outer surface 12c, the intermediate outer surface 12d and the rear contact outer surface 12e are formed at different angles with respect to a central, longitudinal axis 22 of the body 12. Specifically, the front contact outer surface 12c is formed at a taper angle 13 (FIG. 9) with respect to the central, longitudinal axis 22 of the body 12, while the intermediate outer surface 12d is formed at a different taper angle with respect to the central, longitudinal axis 22 of the body 12. A taper angle 13 in the range of about 1 degree to about 5 degrees has proven to be acceptable. For example, the taper angle 13 may be about 2 degrees, 52 minutes (1:10) with respect to the central, longitudinal axis 22 of the body 12. Unlike the front contact outer surface 12c and the intermediate outer surface 12d, the rear contact outer surface 12e has a straight diameter that does not vary along its length. In other words, the rear contact outer surface 12e is formed at a zero taper angle with respect to the central, longitudinal axis of the body 12 (i.e., substantially parallel to the central, longitudinal axis 22).

The body 12 includes a V-shaped notch 12f that may be formed around the periphery of the flange member 12b. Alternatively, the V-shaped notch 12f may be omitted. One or more bores 12g are formed in the intermediate tapered portion 12 and extend radially with respect to a central bore 12h of the body 12. The bores 12g may be provided with threads for receiving a threaded fastener, such as a screw, bolt and the like. In the illustrated embodiment, two bores 12g are formed at an angle of approximately 180 degrees with respect to each other. The purpose of the bores 12g is to accommodate a fastener 20, such as a retention screw, a press-fit pin, and the like, that limits movement of the adapter sleeve 14 along the central, longitudinal axis 22 of the body 12. Thus, the fastener 20 acts as an axial stop for the adapter sleeve 14. It will be appreciated that the invention can be practiced with a greater number of bores 12g and fasteners 20, if needed. A portion of the central bore 12h of the body 12 may be threaded to accommodate a retention knob (not shown) of a type well-known in the art that is used to apply a force along the central, longitudinal 22 to secure the tool holder 10 in the clamping receptacle 28. The flange member 12b of the body 12 also includes a flange contact surface 12k that is substantially perpendicular to the longitudinal axis 22 of the body 12.

Figure 7:
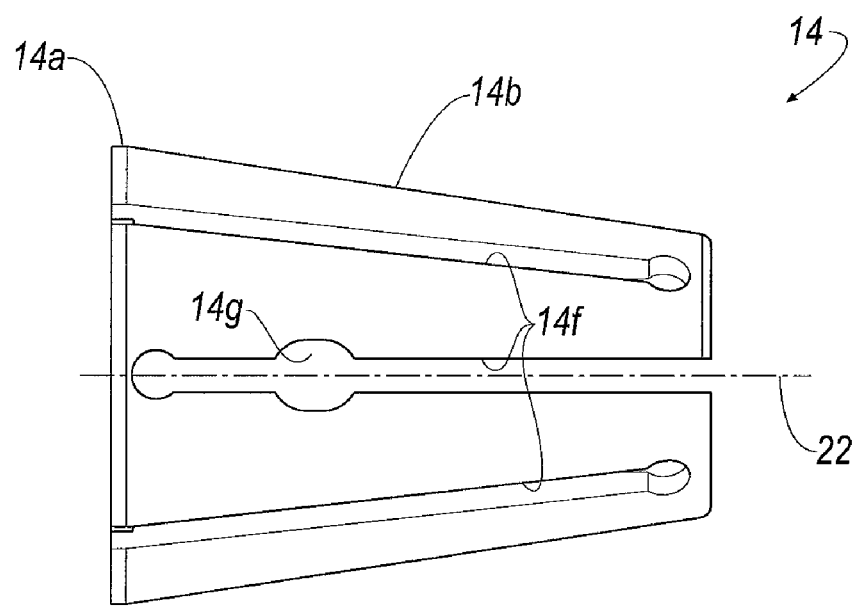
FIG. 7 is a side view of the adapter sleeve of the rotary tapered tool holder according to an embodiment of the invention.
Figure 8:
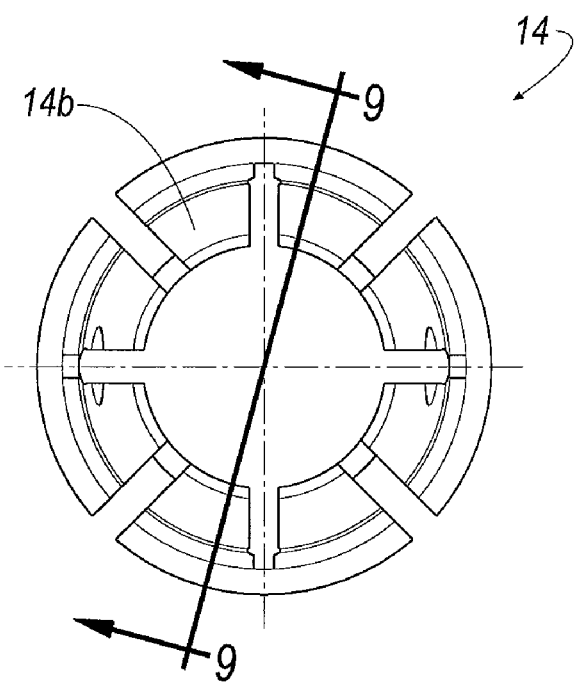
FIG. 8 is an end view of the adapter sleeve of the rotary tapered tool holder according to an embodiment of the invention.
Figure 9:
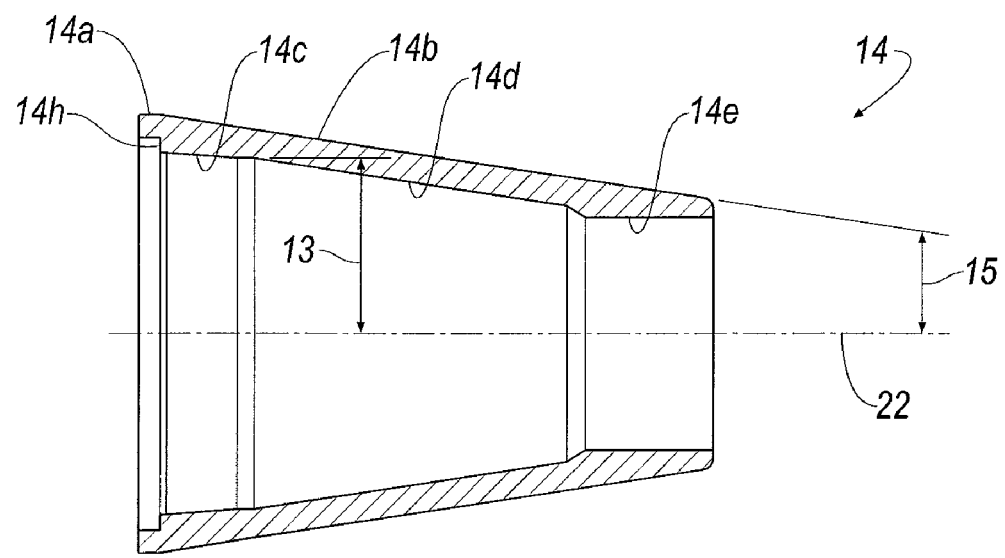
FIG. 9 is a cross-sectional view of the adapter sleeve of the rotary tapered tool holder according to an embodiment of the invention taken along line 9-9 of FIG. 8.

Referring now to FIGS. 7-9, the adapter sleeve 14 has a generally annular body with an inner and outer surface. The outer surface includes a first outer surface 14a having a zero taper angle, and a second outer surface 14b having approximately the same taper angle as the intermediate outer surface 12d of the body 12. In other words, the second outer surface 14b has a taper angle 15 of about 8 degrees, 17 minutes, 52 seconds (7:24) and is adapted to provide contact with the tapered bore 26 of the clamping receptacle 28.

The inner surface of the adapter sleeve 14 includes a front contact inner surface 14c, an intermediate tapered inner surface 14d and a rear contact inner surface 14e. The intermediate tapered inner surface 14 is between the front and rear surfaces 14c, 14e. Similar to the body 12, the front contact inner surface 14c, the intermediate inner surface 14d and the rear contact inner surface 14e are formed at different angles with respect to the central, longitudinal axis 22 of the body 12. Specifically, the front contact inner surface 14c is formed at taper angle that is substantially identical to the taper angle 13 of the front contact outer surface 12c of the body 12 (of about 1:10) so as to selectively engage the front contact outer surface 12c of the body 12. The intermediate inner surface 14d is formed at a taper angle, which is approximately the same taper angle as the intermediate outer surface 12d of the body 12. Similar to the rear contact outer surface 12e of the body 12, the rear contact inner surface 14e of the adapter sleeve 14 has a constant diameter that does not vary along its length to selectively engage the rear contact outer surface 12e of the body 12. In other words, the rear contact inner surface 14e is formed at a zero taper angle with respect to the central, longitudinal axis of the body 12. As described below, the rear contact inner surface 14e acts as a support band and an axial stop when the tool holder 10 is assembled. The adapter sleeve 14 also includes a plurality of longitudinally extending slots 14f to provide additional flexibility to the adapter sleeve 14 such that the adapter sleeve 14 can expand and/or contract in the radial direction in a controlled manner.

In operation, when the adapter sleeve 14 is in a relaxed state, the front contact surface 14c and the rear contact surface 14e are slightly larger in diameter than the front contact surface 12c and the rear contact surface 12e of the body 12 such that the adapter sleeve 14 can be loosely fit over the body 12. However, when clamping the tool holder 10 into the clamping receptacle 28, the slots 14f allow the adapter sleeve 14 to flex circumferentially and allow the adapter sleeve 14 to enter the tapered bore 26 of the clamping receptacle 28. At this point, the adapter sleeve 14 "adapts" the 7:24 taper angle to the 1:10 taper angle. Then, the rear contact surface 12e of the tool holder body 12 and the rear contact surface 14e of the adapter sleeve 14 contact each other to serve as an axial stop and support band for the adapter sleeve 14. After the rear contact surfaces 12e, 14e contact each other to stop the axial movement of the adapter sleeve 14, the continued axial movement of the tool holder body 12 produces contact between the front contact surface 12c of the tool holder body 12 and the front contact surface 14c of the adapter sleeve 14. This movement of the tool holder body 12 relative to the adapter sleeve 14 leads to elastic deformation (interference fit) of the front contact surfaces 12c and 14c until face contact is achieved between the flange contact surface 12k of the body 12 and the face contact surface 28a of the clamping receptacle 26. As a result of this face contact, the tool holder 10 of the invention can achieve better accuracy and balance at a higher rotational speed as compared to conventional tool holders.

In one embodiment, the slots 14f extend in an alternating arrangement such that one slot 14f extends from the rear of the adapter sleeve 14 toward the front, while an adjacent slot 14f extends from the front of the adapter sleeve 14 toward the rear. In the illustrated embodiment, the adapter sleeve 14 has a total of eight (8) slots 14f that are circumferentially spaced equidistant from each other (i.e., approximately forty-five (45) degrees apart). It will be appreciated that the invention is not limited by the number of slots 14f, and that the invention can be practiced with any desirable number of slots. For example, the invention can be practiced with six (6) slots or four (4) slots, and the like. In addition, it can understood by one skilled in the art that the invention can be practiced by separating the adapter sleeve 14 into a plurality of separate segments (not shown) that are retained by well-known means, such as O-rings, expansion springs, and the like.

One or more slots 14f may include a substantially circular aperture 14g that allows the fastener 20 to pass therethrough. In the illustrated embodiment, the adapter sleeve 14 includes two (2) apertures 14g that are approximately 180 degrees apart from each other and are substantially aligned with the bores 12g of the body 12 when the tool holder 10 is assembled. It will be appreciated that the invention is not limited by the number of apertures 14g, and that the invention can be practiced with any desirable number of apertures. For example, the invention can be practiced with four (4) apertures, and the like.

A circumferential notch 14h may be formed in the front end of the adapter sleeve 14 to increase the flexibility of the front end of the adapter sleeve 14 to be substantially similar to the flexibility of the rear end of the adapter sleeve 14. A biasing means 16 for exerting a force against the adapter sleeve 14 in a direction (as indicated by the arrows 17 in FIG. 3) along the central, longitudinal axis 22 of the body 12 and to urge the adapter sleeve 14 away from the flange 12k and toward the rear to force contact between the rear surfaces 12e and 14e. The biasing means 16 also holds the front contact surface 14c of the adapter sleeve 14 away from the front contact surface 12c of the tool holder body 12 before assemble to the clamping receptacle 28. In an embodiment, the biasing means 16 may comprise at least one spring, such as a compression spring, a wave spring, and the like. The amount of force exerted by the biasing means 16 may be between about 20 lbs to about 200 lbs. In one embodiment, the biasing means 16 comprises a plurality of wave springs that exert a total force of about 120 lbs against the adapter sleeve 14. The fastener 20 prevents excessive movement of the adapter sleeve 14 when force is exerted against the adapter sleeve 14 by the biasing means 16. The amount of axial movement of the adapter sleeve 14 can be selectively adjusted by varying the dimension of the aperture 14g.

Figure 10:
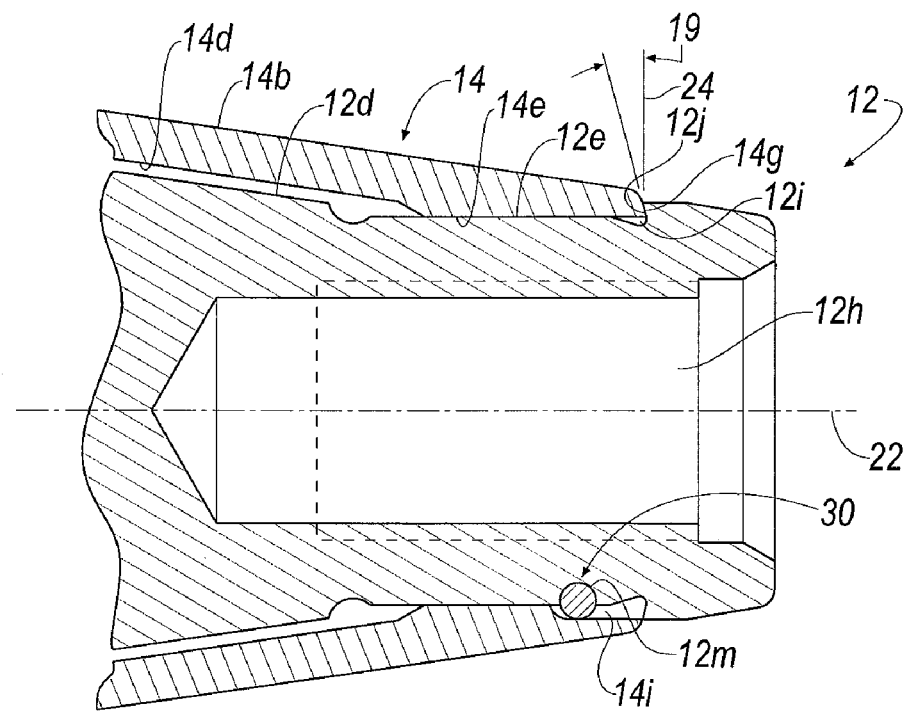
FIG. 10 is an enlarged cross-sectional view of the rear end of the adapter sleeve and tool holder body with an axial stop in accordance with an alternative embodiment of the invention.

Referring now to FIG. 10, an alternative embodiment of the tool holder body 12 and the adapter sleeve 14 is shown. In this embodiment, the bores 12g in the tool holder body 12, the aperture 14g in the adapter sleeve 14 and the fastener 20 (FIG. 1) to prevent axial movement of the adapter sleeve 14 are eliminated. The elimination of the bore 12g in the tool holder body 12 and the aperture 14g in the adapter sleeve 14 allows sealing the adapter slots 14f to further prevent the possibility of unwanted contaminants from entering between the adapter sleeve 14 and the tool holder body 12.

In the alternative embodiment, the tool holder body 12 includes a circumferential notch 12i that forms an abutment surface 12j formed at an angle 19 with respect to a vertical axis 24 of the tool holder body 12. In the illustrated embodiment, the angle 19 is between about 5 degrees and about 20 degrees. For example, an angle 19 of about 15 degrees has been proven to be an acceptable angle for the abutment surface 12j. The adapter sleeve 14 includes a nose portion 14g that contacts the abutment surface 12j of the tool holder body 12 to prevent excessive axial movement of the adapter sleeve 14 when the tool holder 10 is assembled. The tool holder body 12 may also include a spherical-shaped depression 12m formed in the rear outside contact surface 12e and the adapter sleeve 14 may also include a slot 14i formed in the rear inside contact surface 14e. The depression 12m in combination with the slot 14i are adapted to accommodate an anti-rotation device 30, such as a ball, and the like, that partially resides within the depression 12m and the slot 14i for preventing unwanted rotation of the adapter sleeve 14 when the tool holder 10 is assembled.

As described above, the tool holder body 12 contains two outer surfaces 12c, 12e that contact the adapter sleeve 14. One surface of the tool holder body 12 is the front contact outer surface 12c with a 1:10 taper angle, and the other surface is the rear contact outer surface 12e with a zero taper angle. The intermediate outside surface 12d is a clearance surface with a taper angle that does not contact the intermediate inner surface 14d of the adapter sleeve 14.

The adapter sleeve 14 has two inner surfaces 14c and 14e that contact the tool holder body 12. One surface is the front contact inner surface 14c with at 1:10 taper angle, and the other surface is the rear contact inner surface 14e with a zero taper angle. The intermediate inner surface 14d is a clearance surface with a taper angle and does not contact the intermediate outer surface 12d of the tool holder body 12. The elastic deformation (interference fit) occurs between contact surfaces 12c and 14c. Surfaces 12e and 14e form a zero clearance slip fit when the tool 10 is clamped.

The outside surface 14a of the adapter sleeve 14 is formed with a 7:24 steep taper angle to mate to the steep taper bore 26 of the clamping receptacle 28. In its free state, the gage diameter of the adapter sleeve 14 is about 0.025 mm to about 0.050 mm (about 0.001" to about 0.002") larger than the gage diameter of the tapered bore 26 of the clamping receptacle 28. To finish machine surface 14c, the adapter sleeve 14 is collapsed in a 7:24 taper around a plug that matches the diameter of the rear contact outside surface 12e of the tool holder body 12. At this stage, the gage diameter of the front contact inner surface 14c is about 0.025 mm to about 0.040 mm (about 0.010" to about 0.0016") smaller than the gage diameter of the front contact outside surface 12c of the tool holder body 12. When these two surfaces 12c, 14c are clamped in the clamping receptacle 28, they form the interference fit. When the tool holder 10 is clamped in the clamping receptacle 28, the flange contact surface 12k of the flange 12b is in contact with the face contact surface 28a of the clamping receptacle 28 and hard contact is present between the adapter sleeve 14, the inside taper of the bore 26 of the clamping receptacle 28 and the two surfaces 12c, 12e of the tool holder body 12. This is what is referred to as "face/taper contact tooling."

The reason that the adapter sleeve 14 is oversized in its free state is to make sure that the adapter sleeve 14 operates correctly during each clamping. Because the interference fit occurs between the surfaces 12c and 14c and the 1:10 taper angle is a sticking taper, the adapter sleeve 14 and tool holder body 12 could stick together upon removal from the clamping receptacle 28. This condition could lead to a less than optimum clamping situation due to the spring biasing means 16 not seating the adapter sleeve 14 against the rear stop (surface 12e). Because the adapter sleeve 14 is in an oversized condition in its free state, removal from the clamping receptacle 28 and the spring biasing means 16 allow the adapter sleeve 14 to be loosely held on the tool holder body 12, which allows for a proper clamping sequence during each clamping.

When the tool holder 10 is clamped in the clamping receptacle 28, the spring biasing means 16 forces the adapter sleeve 14 into the inside taper of the bore 26 of the clamping receptacle 28. This clamping action collapses the adapter sleeve 14 as the adapter sleeve 14 moves relative to the bore 26 until the rear inside contact surface 14e of the adapter sleeve 14 contacts the rear outside contact surface 12e of the tool holder body 12. At this point, the adapter sleeve 14 stops its axial motion. However, the clamping sequence continues as the surfaces 12c and 14c make contact. The tool holder body 12 continues to move axially as the surfaces 12c and 14c undergo elastic deformation. This deformation (interference fit) continues until the flange contact surface 12k of the flange 12b on the tool holder body 12 contacts the face contact surface 28a of the clamping receptacle 28. The preferred taper angles of the surfaces 12c and 14c is between about 2 degrees and about 10 degrees. A 1:10 taper angle (5 degrees, 43 minutes) has been proven to be an acceptable angle for an interference fit.

As described above, only the front and rear contact inner surfaces 14c, 14e of the adapter sleeve 14 contact the front and rear contact outer surfaces 12c, 12e of the body 12, respectively. However, it will be appreciated that the invention can be practiced such that there is continuous contact between the body 12 and the adapter sleeve 14 when the tool holder 10 is assembled.

One aspect of the invention is that the outer surface 14b of the adapter sleeve 14 has a steep taper angle 15 of about 7:24, while a portion of the inner contact surface 14c of the adapter sleeve 14 proximate the front end has a different taper angle 13 of about 1:10 with respect to the central, longitudinal axis 22 of the body 12. This difference between the non-zero, steep taper angle 15 of the outer surface 14b and the relatively smaller non-zero, taper angle 13 of the front inner contact surface 14c of the adapter sleeve 14 and the front contact surface 12c of the body 12 causes the adapter sleeve 14 to "adapt" and provide an optimized elastic deformation (interference fit) between the inner surface 14c of the adapter sleeve 14 and the front contact surface 12c of the tool holder body 12.

Another aspect of the invention is that a portion of the outer surface proximate the rear end of the adapter sleeve 14 has a steep taper angle 15 of about 7:24, while a portion of the inner surface of the adapter sleeve 14 proximate the rear end has a different taper angle of about zero degrees with respect to the central, longitudinal axis 22 of the body 12. This difference between the steep taper angle 15 of the outer surface 14b and the zero taper angle of the inner surface 14e causes the adapter sleeve 14 to provide support to the rear end of the adapter sleeve 14 and act as a stop when the tool holder 10 is assembled.

As described above, the tool holder 10 of the invention includes an adapter sleeve 14 that can "adapt" to a taper angle that is suitable for face/taper contact tooling. In the illustrated embodiment, the taper angle is approximately 1:10. The concept of the invention is accomplished with the use of the adapter sleeve 14 that is forced into the tapered bore 26 of the clamping receptacle 28 of the rotary tapered tool holder 10 in a spring-loaded fashion. The rear contact surface 12e of the body 12 and the rear contact surface 14e of the adapter sleeve 14 both have a constant diameter that act as a support band and a stop to locate the adapter sleeve at a fixed axial position in the flangeless design. Once the adapter sleeve 14 is in its final, fixed axial position, the central part of the tool holder 10 is drawn into face contact. At the face contact position, an interference fit situation exists between the 1:10 taper angle of the front contact surface 12c of the body 12 of the tool holder 10 and the front contact surface 14c of the adapter sleeve 14. The interference fit situation forces the outer surface of the adapter sleeve 14 into positive contact with the tapered bore 26 of the clamping receptacle 28 of the rotary tapered tool holder 10. The adapter sleeve 14 is manufactured with dimensions that provide a slight clearance between the intermediate surface 14d of the adapter sleeve 14 and the intermediate surface 12d of the body 12 of the toolholder 10. This slight clearance allows for contact between the tool holder body 12 and the adapter sleeve 14 to be limited to the front and rear contact surfaces 12c, 14c, 12e, 14e.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A rotary tapered tool holder, comprising:
a body including a first contact outer surface formed at a first taper angle with respect to a central, longitudinal axis of the body, a second contact outer surface formed at a second taper angle with respect to the central, longitudinal axis of the body, and a flange contact surface substantially perpendicular to the central, longitudinal axis of the body;
an adapter sleeve disposed about a portion of the body, the adapter sleeve including an inner surface and an outer surface, the inner surface including a first contact inner surface formed at approximately the first taper angle, a second contact inner surface formed at approximately the second taper angle, the outer surface formed at a third taper angle; and
a fastener capable of passing through an aperture in the adapter sleeve and being received in a bore in the body for limiting movement of the adapter sleeve in a direction along the central, longitudinal axis of the body,
wherein the first, second and third taper angles are different from each other to cause an interference fit between the adapter sleeve and a tapered bore of a clamping receptacle when the rotary tapered tool holder is assembled into the clamping receptacle, and
wherein the flange contact surface of the body engages a face contact surface of the clamping receptacle when the rotary tapered tool holder is assembled into the clamping receptacle.

2. The rotary tapered tool holder of claim 1, wherein the first taper angle is smaller than the third taper angle.

3. The rotary tapered tool holder of claim 2, wherein the first taper angle is in a range of about 1 degrees to about 5 degrees and the third taper angle is about 8 degrees, 17 minutes, 52 seconds (7:24).

4. The rotary tapered tool holder of claim 1, wherein the first and third taper angles are non-zero, and wherein the second taper angle is equal to zero.

5. The rotary tapered tool holder of claim 1, wherein the second taper angle is smaller than the third taper angle.

6. The rotary tapered tool holder of claim 5, wherein the second taper angle is equal to zero, and wherein the third taper angle is non-zero.

7. The rotary tapered tool holder of claim 1, wherein the adapter sleeve further comprises at least one slot.

8. The rotary tapered tool holder of claim 1, wherein the body further includes a circumferential notch formed in the second outside contact surface that forms an abutment surface.

9. The rotary tapered tool holder of claim 8, wherein the body further includes a depression, and wherein the adapter sleeve further includes a slot adapted to accommodate an anti-rotation device.

10. The rotary tapered tool holder of claim 8, wherein the circumferential notch is formed at an angle with respect to a vertical axis of the tool holder body.

11. The rotary tapered tool holder of claim 1, further comprising means for biasing the adapter sleeve against the tapered bore of the clamping receptacle.

12. The rotary tapered tool holder of claim 11, wherein the biasing means comprises at least one spring.

13. A rotary tapered tool holder, comprising:
a body including a first contact outer surface formed at a first, non-zero taper angle with respect to a central, longitudinal axis of the body, a second contact outer surface formed at a zero taper angle with respect to the central, longitudinal axis of the body, and a flange contact surface substantially perpendicular to the central, longitudinal axis of the body;
an adapter sleeve disposed about a portion of the body, the adapter sleeve including an inner surface and an outer surface, the inner surface including a first contact inner surface formed at the first, non-zero taper angle, a second contact inner surface formed at the zero taper angle, and an outer surface formed at a second, non-zero taper angle; and
a fastener capable of passing through an aperture in the adapter sleeve and being received in a bore in the body for limiting movement of the adapter sleeve in a direction along the central, longitudinal axis of the body,
wherein the second, contact outer surface of the body and the second contact inner surface of the adapter sleeve provide an axial stop and support band for the adapter sleeve when the rotary tapered tool holder is assembled into a clamping receptacle, and
wherein the flange contact surface of the body engages a face contact surface of the clamping receptacle when the rotary tapered tool holder is assembled into the clamping receptacle.

14. The rotary tapered tool holder of claim 13, wherein the first, non-zero taper angle is smaller than the second, non-zero taper angle.

15. The rotary tapered tool holder of claim 14, wherein the first, non-zero taper angle is in a range of about 1 degrees to about 5 degrees and the second non-zero taper angle is about 8 degrees, 17 minutes, 52 seconds (7:24).

16. The rotary tapered tool holder of claim 13, wherein the first, non-zero taper angle is different than the second, non-zero taper angle to cause an interference fit between the adapter sleeve and a tapered bore of the clamping receptacle when the rotary tool holder is assembled into the clamping receptacle.

17. A method of assembling a rotary tapered tool holder, the tool holder comprising a body including a first contact outer surface, a second contact outer surface, and a flange contact surface; and an adapter sleeve disposed about a portion of the body, the adapter sleeve including an inner surface and an outer surface, the inner surface including a first contact inner surface, a second contact inner surface, and a fastener capable of passing through an aperture in the adapter sleeve and being received in a bore in the body, the method comprising the steps in the following order:

(a) moving the tool holder body and the adapter sleeve in an axial direction in a clamping receptacle until the second contact outer surface of the body contacts the second contact inner surface of the adapter sleeve;

(b) moving the tool holder body relative to the adapter sleeve in the axial direction in the clamping receptacle until the first contact outer surface of the body contacts the first contact inner surface of the adapter sleeve and the fastener limits movement of the adapter sleeve in a direction along a central, longitudinal axis of the body; and (c) moving the tool holder body relative to the adapter sleeve in the axial direction in the clamping receptacle to produce elastic deformation of the adapter sleeve until the flange contact surface of the body engages a face contact surface of the clamping receptacle.

* * * * *